(12) United States Patent
Allanson et al.

(10) Patent No.: US 7,818,222 B2
(45) Date of Patent: Oct. 19, 2010

(54) METHOD AND SYSTEM FOR ORGANIZING TAX INFORMATION AND PROVIDING TAX ADVICE

(75) Inventors: Tom Allanson, Cardiff By The Sea, CA (US); Marc West, Kansas City, MO (US); Neal Shaw, Shawnee, KS (US)

(73) Assignee: HRB Innovations, Inc., Kansas City, MO (US)

( * ) Notice: Subject to any disclaimer, the term of this patent is extended or adjusted under 35 U.S.C. 154(b) by 0 days.

(21) Appl. No.: 11/948,737

(22) Filed: Nov. 30, 2007

(65) Prior Publication Data

US 2008/0189197 A1 Aug. 7, 2008

Related U.S. Application Data

(60) Provisional application No. 60/868,051, filed on Nov. 30, 2006.

(51) Int. Cl.
G06F 17/22 (2006.01)
G07F 19/00 (2006.01)

(52) U.S. Cl. .............................. 705/31; 705/30; 705/38

(58) Field of Classification Search .................. 705/31, 705/14, 19, 10, 30, 35, 36 T, 38, 2, 9; 235/375, 235/376, 379; 715/777, 764; 706/47
See application file for complete search history.

(56) References Cited

U.S. PATENT DOCUMENTS

| | | | | |
|---|---|---|---|---|
| 5,765,144 | A * | 6/1998 | Larche et al. .................. | 705/38 |
| 6,697,787 | B1 * | 2/2004 | Miller .......................... | 705/31 |
| 7,539,635 | B1 * | 5/2009 | Peak et al. .................... | 705/31 |
| 2002/0103749 | A1 * | 8/2002 | Agudo et al. ................. | 705/38 |
| 2003/0061131 | A1 * | 3/2003 | Parkan, Jr. ................... | 705/30 |
| 2003/0144931 | A1 * | 7/2003 | Stokes et al. ................. | 705/31 |
| 2004/0044546 | A1 * | 3/2004 | Moore .......................... | 705/2 |
| 2004/0083145 | A1 * | 4/2004 | Kobayashi et al. ............ | 705/31 |
| 2006/0085303 | A1 * | 4/2006 | Reeb ............................ | 705/31 |
| 2006/0178961 | A1 * | 8/2006 | Stanley et al. ................. | 705/31 |
| 2006/0271451 | A1 * | 11/2006 | Varughese .................... | 705/31 |
| 2007/0033116 | A1 * | 2/2007 | Murray ........................ | 705/31 |

(Continued)

OTHER PUBLICATIONS

Business Editors and High Tech Writers. "WebTurboTax Brings the Full Power of TurboTax to the Web; Federal & All State Returns Can Now be Prepared and Filed Without Installing or Downloading Software." Business Wire Jan. 20, 1999 Business Dateline, ProQuest. Web. Jun. 9, 2010.*

(Continued)

*Primary Examiner*—Matthew S. Gart
*Assistant Examiner*—Olusegun Goyea
(74) *Attorney, Agent, or Firm*—Richard T. Black; P.G. Scott Born; Black Lowe & Graham

(57) ABSTRACT

A method includes providing to a user a set of computer-executable instructions that, when executed by a user's electronic device, generate a user interface displayable on a display device coupled to the user's electronic device, presenting to the user via the user interface a plurality of solicitations for a set of personal information describing characteristics of the user, receiving via the user interface the personal information set, and, based on the personal information set, generating to the user interface a checklist of tax return preparation information to be compiled by the user.

17 Claims, 9 Drawing Sheets

U.S. PATENT DOCUMENTS

| | | | |
|---|---|---|---|
| 2007/0033117 A1* | 2/2007 | Murray | 705/31 |
| 2007/0094206 A1* | 4/2007 | Yu et al. | 706/47 |
| 2007/0094207 A1* | 4/2007 | Yu et al. | 706/47 |
| 2007/0136157 A1* | 6/2007 | Neher et al. | 705/31 |
| 2007/0250418 A1* | 10/2007 | Banks et al. | 705/31 |
| 2008/0059900 A1* | 3/2008 | Murray et al. | 715/777 |
| 2008/0071600 A1* | 3/2008 | Johnson | 705/9 |

OTHER PUBLICATIONS

Business Editors. "Turbotax Streamlines Tax Preparation With Customized Interview for the 1998 Tax Year; New Home and Business Product Serves the Needs of Sole Proprietors." Business Wire Dec. 2, 1998 Business Dateline, ProQuest. Web. Jun. 9, 2010.*

Isaac M O'Bannon. "Tax programs offer new features for TY2003." CPA Software News Jan. 1, 2004: Accounting & Tax Periodicals, ProQuest. Web. Jun. 9, 2010.*

* cited by examiner

Personal information 2006 filling status
- ○ Single
- ● Married filling jointly
- ☐ Got married in 2006
- ○ Married filling seperately
- ○ Head of household
- ○ Qualifying widow(er)

Age [ ]  Spouse's Age [ ]

- ☑ My spouse or I attended college or vocational school in 2006
- ☑ My spouse or I served in the military

Dependents
- ☑ Born in 2006
- ☑ Adopted in 2006
- ☑ Attended daycare in 2006
- ☑ Started college in 2006
- ☑ Supported a dependent adult in 2006

[Continue]

Tax preparation checklist

Personal information
- Last year's federal and state returns(s)
- Your Social Security number
- Your spouse's full name, Social Security number, and date of birth
- Name(s), date(s) of birth, and Social Security number(s) of dependent(s)
- Child care records (including the provider's ID Social Security number or Employer ID number)

Education information
- Form(s) 1098-T or other records of education expenses
- Records of all adoption expenses, whenever incurred, and adoption status Personal summary    Need help? Click here to e-mail customer support.

*organizit*

400

*organizit*

1 Welcome  2 Personal  3 Income  4 Deductions  5 Summary 402, 404, 410, 415, 420, 425

Where did your money go in 2006?

- ☑ Home mortgage interest and points (1098 or a letter from your mortgage company)
- ☑ Real estate taxes, vehicle and personal property taxes, foreign taxes
- ☑ Donations of money to charities (including donations by check, credit card or payroll withdrawal)
- ☑ Donations of stuff to charity (things like clothes, cars, furniture, etc.)
- ☑ Student loan interest (1098-E)
- ☑ Estimated tax payments and other income tax payments (other than withholding)
  - ☑ Federal income tax payments (not on a W-2)
  - ☑ Federal estimated tax payments (not on a W-2)
  - ☑ Federal extension payments (2006 From 4868)
  - ☑ Last year's federal refund that you applied to this year's taxes
  - ☑ Federal miscellaneous income tax payments (withholding not found anywhere else)
- ☑ State or local income tax payments (not on a W-2)
  - ☑ State or local estimated tax payments
  - ☑ State or local tax extension payments
  - ☑ Last year's state or local refund that you applied to this year's taxes 430, 450

*Need help? Click here to e-mail customer support.*

440, 452, 442

ⓘ Tax preparation checklist

- Form(s) 5498 for your IRA contributions

Rental property information

- Records of rental property income and expenses
- Real estate records: what you paid, improvements you've made, depreciation you've taken
- Total miles driven for the year (or beginning/ending odometer readings) for vehicles used in activity
- Amount of parking and tolls paid related to rental activity
- If you want to claim actual expenses, receipts or totals for rental-related gas, oil, car washes, licenses, personal property tax, lease or interest expense, etc.

Other income information

- Schedule K-1 from the partnership, S Corp, trust or estate

444

METHOD AND SYSTEM FOR ORGANIZING TAX INFORMATION AND PROVIDING TAX ADVICE

PRIORITY CLAIM

This application claims the benefit of and priority to U.S. Provisional Patent Application Ser. No. 60/868,051 filed Nov. 30, 2006, which is incorporated by reference herein in its entirety.

BACKGROUND OF THE INVENTION

Many of those who prepare for filing tax returns are unfamiliar with and may be confused by the type and/or amount of data needed to answer tax return questions and the supporting documentation that is required to be submitted with a tax return. No known electronic tax-preparation products inform return filers of the documentation and other materials required to enable return preparation.

SUMMARY OF THE INVENTION

In an embodiment of the invention, a method includes providing to a user a set of computer-executable instructions that, when executed by a user's electronic device, generate a user interface displayable on a display device coupled to the user's electronic device, presenting to the user via the user interface a plurality of solicitations for a set of personal information describing characteristics of the user, receiving via the user interface the personal information set, and, based on the personal information set, generating to the user interface a checklist of tax return preparation information to be compiled by the user.

BRIEF DESCRIPTION OF THE DRAWINGS

Preferred and alternative embodiments of the present invention are described in detail below with reference to the following drawings.

FIGS. 3-8 show screenshots of a user interface in accordance with an embodiment of the systems and methods described herein.

DETAILED DESCRIPTION OF THE PREFERRED EMBODIMENT

Figure 1:
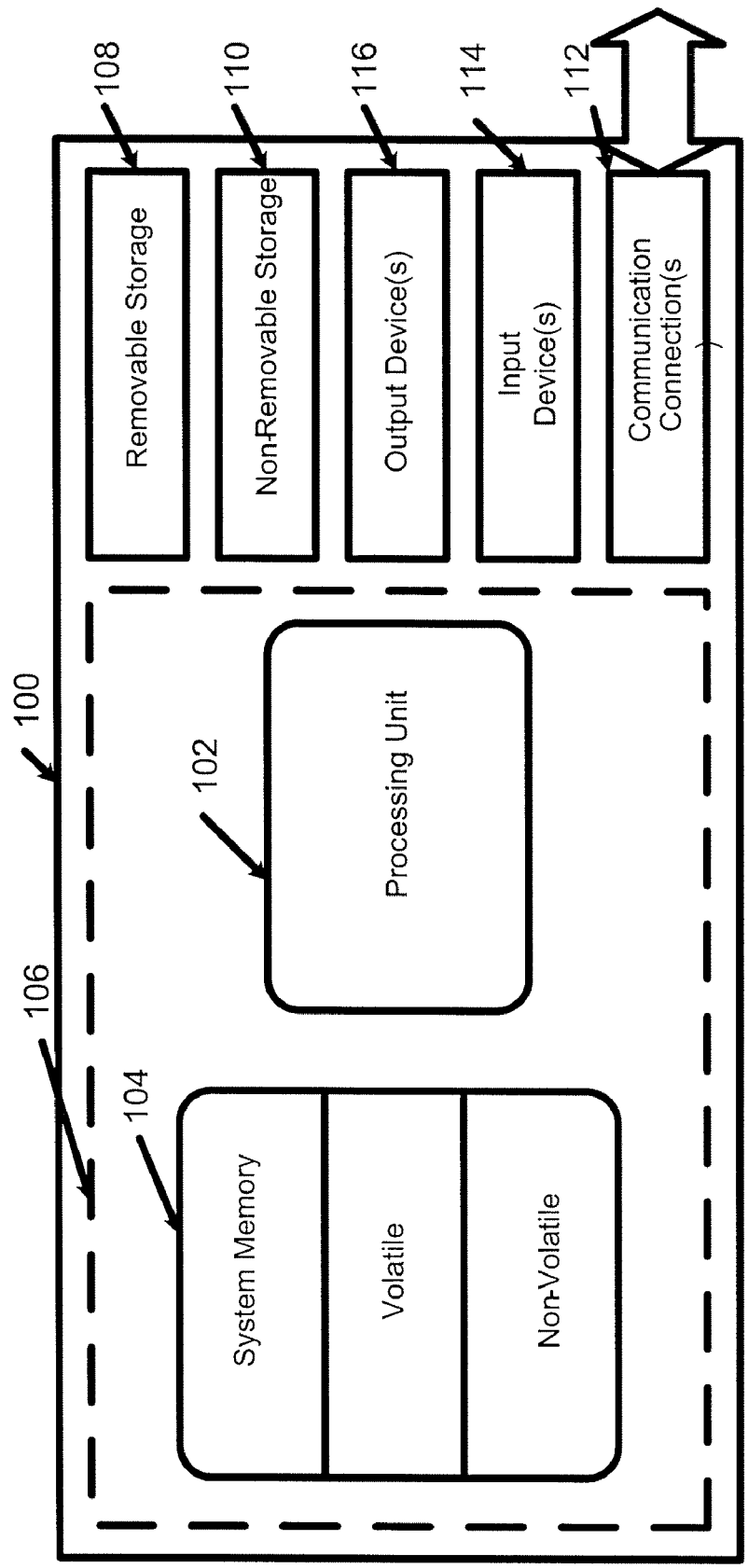
FIG. 1 is a schematic view of an exemplary operating environment in which an embodiment of the invention can be implemented.

FIG. 1 illustrates an example of a computing system environment 100 in which an embodiment of the invention may be implemented. The computing system environment 100, as illustrated, is an example of a suitable computing environment; however it is appreciated that other environments, systems, and devices may be used to implement various embodiments of the invention as described in more detail below.

Embodiments of the invention are operational with numerous other general-purpose or special purpose computing system environments or configurations. Examples of well-known computing systems, environments, and/or configurations that may be suitable for use with embodiments of the invention include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

Embodiments of the invention may be described in the general context of computer-executable instructions, such as program modules being executed by a computer. Generally, program modules include routines, programs, objects, components, data structures, etc. that perform particular tasks or implement particular abstract data types. Embodiments of the invention may also be practiced in distributed-computing environments where tasks are performed by remote processing devices that are linked through a communications network. In a distributed computing environment, program modules may be located in both local and remote computer storage media including memory storage devices.

With reference to FIG. 1, an exemplary system for implementing an embodiment of the invention includes a computing device, such as computing device 100. The computing device 100 typically includes at least one processing unit 102 and memory 104.

Depending on the exact configuration and type of computing device, memory 104 may be volatile (such as random-access memory (RAM)), nonvolatile (such as read-only memory (ROM), flash memory, etc.) or some combination of the two. This most basic configuration is illustrated in FIG. 1 by dashed line 106.

Additionally, the device 100 may have additional features, aspects, and functionality. For example, the device 100 may include additional storage (removable and/or non-removable) which may take the form of, but is not limited to, magnetic or optical disks or tapes. Such additional storage is illustrated in FIG. 1 by removable storage 108 and non-removable storage 110. Computer storage media includes volatile and nonvolatile, removable and non-removable media implemented in any method or technology for storage of information such as computer-readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 100. Any such computer storage media may be part of device 100.

The device 100 may also include a communications connection 112 that allows the device to communicate with other devices. The communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, the communication media includes wired media such as a wired network or direct-wired connection, and wireless media such as acoustic, radio-frequency (RF), infrared and other wireless media. The term computer-readable media as used herein includes both storage media and communication media.

The device 100 may also have an input device 114 such as keyboard, mouse, pen, voice-input device, touch-input device, etc. Further, an output device 116 such as a display, speakers, printer, etc. may also be included. Additional input devices 114 and output devices 116 may be included depending on a desired functionality of the device 100.

Figure 2:
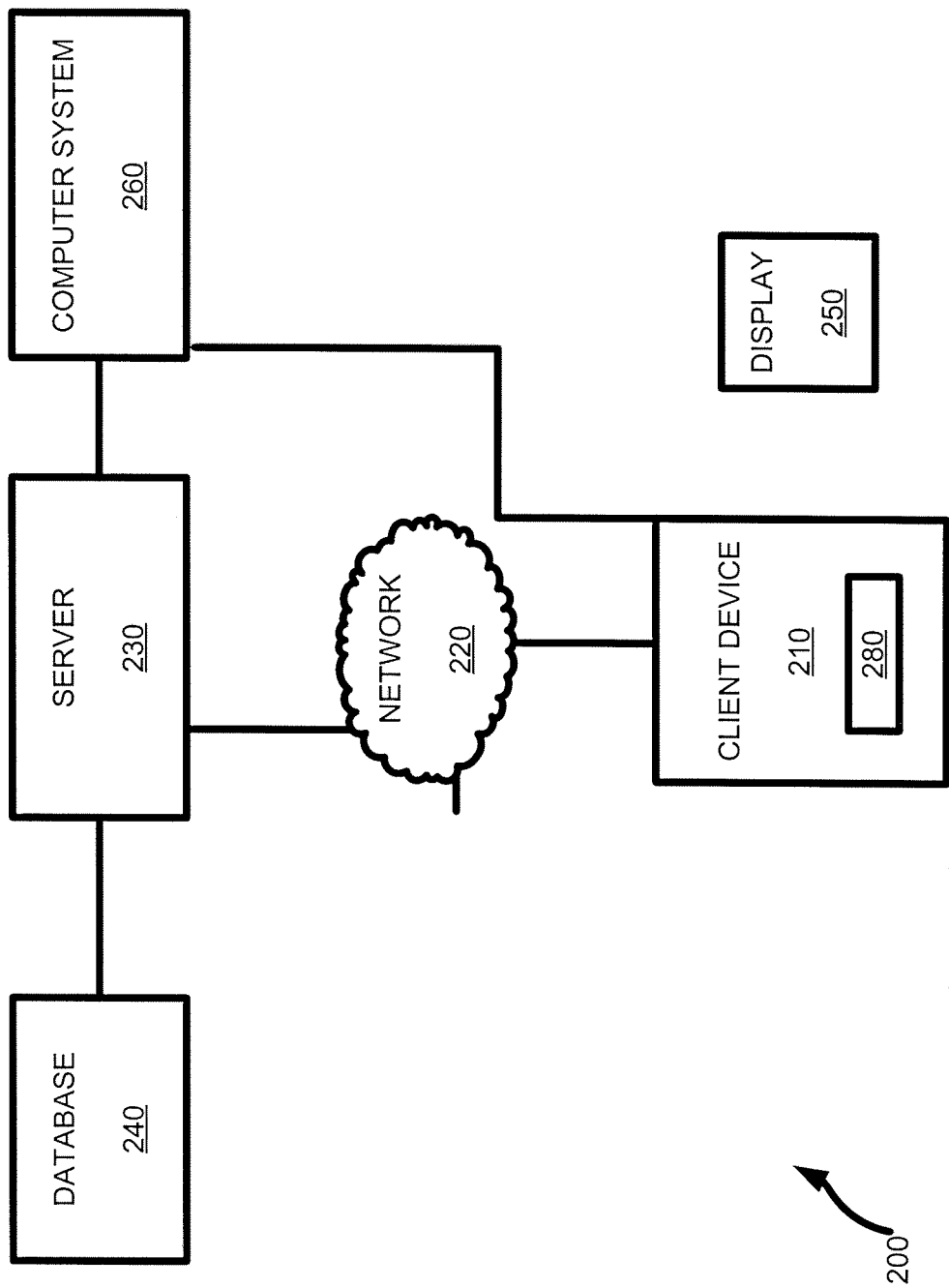
FIG. 2 is a functional block diagram of an exemplary operating environment in which an embodiment of the invention can be implemented.

Referring now to FIG. 2, an embodiment of the present invention takes the form of an exemplary computer network system 200. The system 200 includes an electronic client device 210, such as a personal computer or workstation, that is linked via a communication medium, such as a network 220 (e.g., the Internet), to an electronic device or system, such as a server 230. The server 230 may further be coupled, or otherwise have access, to a database 240 and a computer system 260. Although the embodiment illustrated in FIG. 2 includes one server 230 coupled to one client device 210 via the network 220, it should be recognized that embodiments of the invention may be implemented using one or more such client devices coupled to one or more such servers.

The client device 210 and the server 230 may include all or fewer than all of the features associated with the device 100 illustrated in and discussed with reference to FIG. 1. The client device 210 includes or is otherwise coupled to a computer screen or display 250. The client device 210 may be used for various purposes such as network- and local-computing processes.

The client device 210 is linked via the network 220 to server 230 so that computer programs, such as, for example, a browser, running on the client device 210 can cooperate in two-way communication with server 230. The server 230 may be coupled to database 240 to retrieve information therefrom and to store information thereto. Database 240 may include a plurality of different tables (not shown) that can be used by the server 230 to enable performance of various aspects of embodiments of the invention. Additionally, the server 230 may be coupled to the computer system 260 in a manner allowing the server to delegate certain processing functions to the computer system.

Still referring to FIG. 2, and in operation according to an embodiment of the invention, a user (not shown) of the client device 210 desiring to electronically generate a checklist of relevant documents or other required information for preparing a tax return uses a browser application running on the client device to access web content, which may, but need not, be served by the server 230. Specifically, by employing an appropriate uniform resource locator (URL) in a known manner, the user may download from the server 230 and install on the client device 210 a tax organizer user interface module 280 comprising computer-executable instructions as described more fully hereinafter. Alternatively, the user may receive the module 280 on a tangible computer-readable medium (not shown), such as, for example, a CD-ROM, and subsequently install the module on the client device 210 from the medium.

Upon execution of the module 280 by the client device 210, a user interface such as that described with reference to FIGS. 3-8, for example, may be displayed on the display device 250. In an example embodiment, the client device 210 is configured similarly to the computing device 100 of FIG. 1, with the module 280 stored in the memory unit 104 and providing instructions for the processing unit 102. In this example, execution of the module 280 causes the processing unit 102 to operate in such a way that the processing unit 102 may be described as having a first component configured to generate a graphical user interface for a tax-return organization program, a second component configured to present solicitations, such as questions, to a user through the user interface on the display, a third component configured to receive answers (e.g., a personal information set) from the user to the presented questions, a fourth component configured to generate a tax preparation checklist based on the received answers, and a fifth component configured to present the tax preparation checklist on the display. In additional examples, the processing unit 102 may be described as having one or more of a sixth component configured to generate advice based on the received answers, a seventh component configured to present the advice on the display, an eighth component configured to store the received answers in the memory for use in a tax preparation program, and a ninth component configured to transfer the stored answers to the tax preparation program. In some embodiments, the fifth component is configured to present the tax preparation checklist incrementally as the user answers the questions and/or the second component is configured to present questions regarding marital status, income, and deductions.

Some example embodiments of the module 280 are referred to as Organizit™. An example embodiment of the invention includes a tax organizer which is embodied via desktop software, online application executed and/or served by, for example, server 230, or combination of both with accompanying expertise and advice about the client's personalized tax situation. An embodiment produces a tax-return preparation checklist along with advice about the client's tax and financial situation that the user can print. In addition, the embodiment allows users to transfer their information into electronic tax-return preparation applications that may include H&R Block® products, such as Online Office™ and OB1™. Certain aspects of the OB1 product are more fully described in commonly owned and co-pending U.S. patent application Ser. No. 11/838,761 titled 'Tax-Return Preparation Systems and Methods', filed Aug. 14, 2007 which is incorporated by reference herein in its entirety. Some embodiments of the invention may also be used in conjunction with other tax preparation applications, aspects of which are disclosed in commonly owned and co-pending U.S. patent application Ser. Nos. 11/334,033 titled 'User Interface for Tax-Return Preparation', filed Jan. 17, 2006 and published as US 2007/0033116; 11/334,730 titled 'User Interface and Data Acquisition for Tax-Return Preparation', filed Jan. 17, 2006 and published as US 2007/0033117; and 11/334,032 titled 'Distributed Tax-Return-Preparation Processing', filed Jan. 17, 2006 and published as US 2007/0033130 all of which are incorporated by reference herein in their entirety.

An example embodiment helps users get organized to do their taxes and get educated about their personal tax situation by having them answer simple questions about their life and financial situation. In an embodiment, the program does not ask the user any personally identifying information such as name, social security number (SSN), etc. After answers are entered, the program gives the user a personalized tax preparation checklist of items which apply to the user based on their answers as well as expertise related to each item and advice such as recommendations specifically targeted towards enhancing the user's tax preparation experience, regardless of whether or not they go to a tax professional or prepare their taxes themselves. Once complete, users can transfer the information that they entered in accordance with an embodiment to either have their taxes prepared remotely with a tax professional via Online Office, or the user can transfer the information into a do-it-yourself (DIY) online or local application.

An embodiment includes a tool which not only provides a list of what the user will need to gather to take with them to a tax professional or have when they prepare their own taxes, but also educates and empowers the user to better understand their tax and financial situation. For example, when a user indicates that they have a W2 form, the user is alerted to the fact that if they have a handwritten W2 they will be unable to eFile or qualify for refund anticipation loans, etc.

An embodiment is structured to have people focus on their life situation. In an example embodiment, users can quickly click down through statements which apply to them, and as they do so, their tax preparation checklist builds, showing them which forms and/or supporting documentation they need. Users can easily find out more information by clicking on links to additional information items, also referred to as 'Tax Tips', which provide specific expertise related to each item that the users have identified as applying to them. Identification of life events such as being married or having a baby also generates links to specific content relevant to the user. Advice specific to what the user needs to know before they go to have their taxes prepared is presented. This educates, empowers and encourages users to discuss key pieces of information with their tax professionals to make certain they communicate their situation and get the most from their tax preparation experience. Once complete, users can print all of this valuable information, or transfer it to a do-it-yourself product locally or online so there is no need to start over. Working with a tax professional is easily just a click away. For those who are looking for the ease and expertise of a tax professional, but the convenience of working remotely, clients can choose to work with a tax professional from a remote location over a network, such as by using the Virtual Tax Office offered by H & R Block, for example. For those who choose to work in person with a tax professional in their area, interactive maps and office information is available right within the organizer itself.

An embodiment of the invention may be employed in the commercial 'do it yourself' tax software market as a product targeting those clients who are looking for expertise in their tax return preparation. Tax software also targets segments of tax consumers having more complex tax returns, but looking for easier and more user-friendly solutions in preparing their taxes.

In an embodiment, users are oriented by being presented with questions throughout an interview via an organization of tabs and/or nested accordions which are explained in more detail below. This facilitates the ability for the user to orient themselves throughout the interview, go back to previously entered information and/or go forward to different portions. In addition, the flow of the interview is modified throughout the experience based on the responses of the user. Responses to certain questions may prompt additional data entry and/or questions that are presented based on the response. This reduces the time necessary to read unrelated questions and/or streamlines the consumer experience to focus on just those questions that are pertinent to the user. Users can see relevant information as they progress through the interview.

Figure 3:
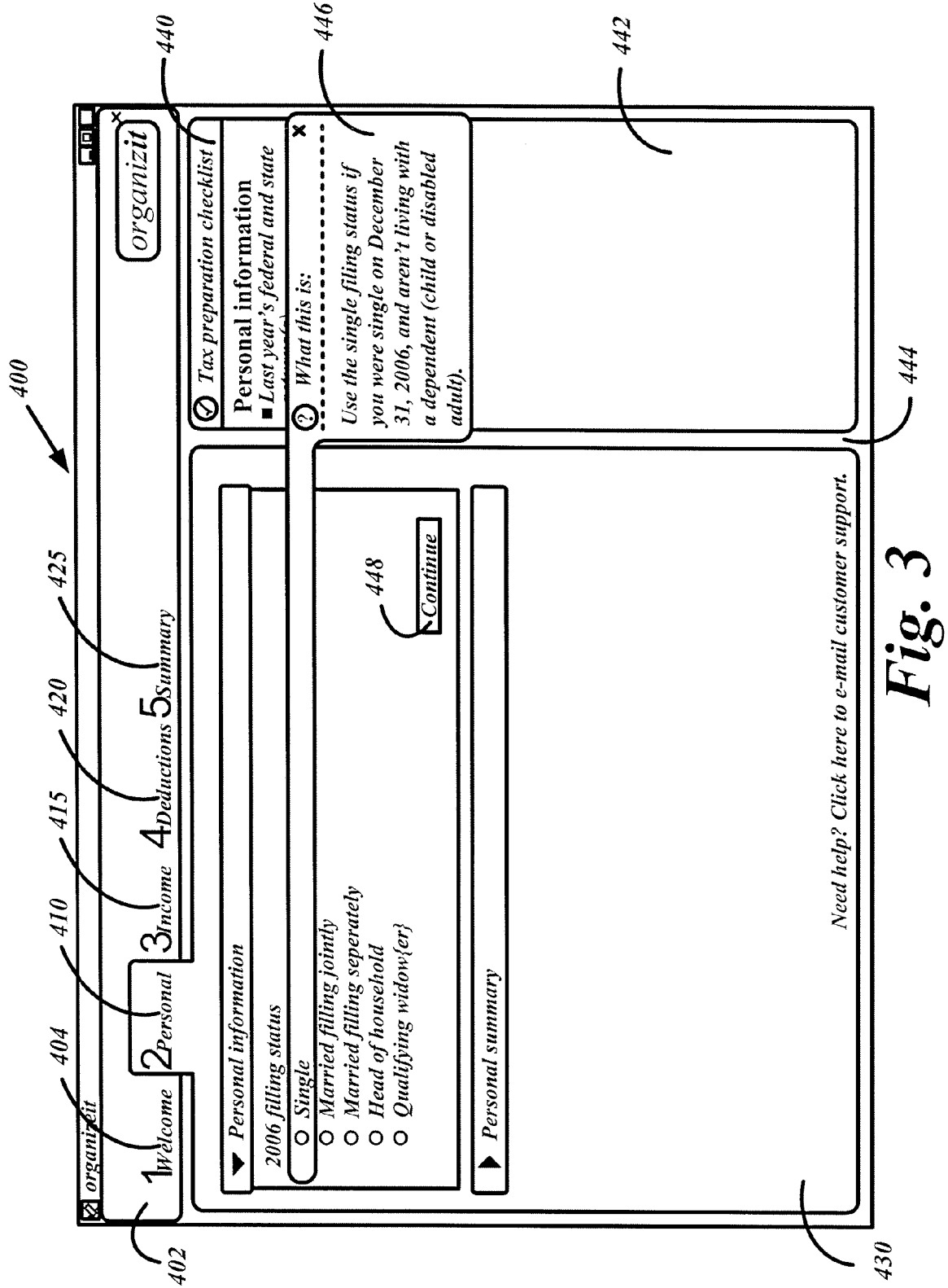

FIG. 3 shows a screenshot of a user interface 400 of an embodiment of the systems and methods described herein, such as the user interface that is displayed upon execution of the module 280 shown in FIG. 2, for example. In one embodiment the interface 400 is generally configured to be served over a network to the user's computer from a location remote from the user's computer. In an additional embodiment, the interface 400 is generally configured to be generated by a desktop application residing on the user's computer. The interface 400 includes a tab bar 402, the tab bar 402 being interactive and capable of being selected by a user, using a conventional pointer. A tab is a high level navigation tool found in the tab bar 402 in one embodiment. Each tab represents a topical selection. In one embodiment, the tab operates as a container for each of the various tax topics that can logically be grouped together.

In the example shown, the tab bar 402 includes a welcome tab 404, a personal tab 410, an income tab 415, a deductions tab 420, and a summary tab 425. In an embodiment, the income tab 415 includes topics related to income earned, the personal tab 410 includes non-identifying personal information related to filing a tax return such as marital status, and the deductions tab 420 includes deductions that a taxpayer may take during the current tax year. Also included are the welcome tab 404, which provides a user with general welcome information, and a summary tab 425, which provides a user with a summary of a generated checklist and further options such as printing.

A tab becomes active when a user selects the tab using a computer peripheral pointing device, such as a mouse. An inactive tab is any tab that is not selected and does not show it contents while another tab is selected as active. In some embodiments, tabs may also be activated using a hover status, which allows an inactive tab to become active when a pointer hovers over the inactive tab. If the pointer is held over a tab using a pointing device for preferably three to five seconds, a click event occurs and that tab is activated. In an example embodiment, information related to an active tab is presented in a first window area 430 and a tax preparation checklist 440 is presented in a second window area 442 that is separated from the first window area 430 by a pane 444. Other presentation formats may be used in other embodiments.

In FIG. 3, the personal tab 410 is active. In an example embodiment, non-identifying personal information is requested. Such non-identifying personal information may include tax filing status (single, married filing jointly, married filing separately, head of household, qualifying widow(er), etc.), age, spouse's age, educational institution attendance, military service, and dependent information. Hovering or clicking with a pointer controlled by a pointing device such as a mouse over/on a particular question or question mark icon may cause a flyout 446 to appear in some embodiments. The flyout 446 provides additional information to help the user correctly provide the requested information. The flyout 446 shown in FIG. 3 is associated with a selection of year 2006 single filing status and states that single filing status should be used if the user was single on Dec. 31, 2006 and is not living with a dependent (child or disabled adult).

FIG. 4 shows a screenshot of the interface 400 after information has been entered in the first window area 430 associated with the personal tab 410. Information may be entered in a plurality of ways in varying embodiments. In FIG. 4, it can be seen that radio buttons, check boxes, and alphanumeric entry windows are used. As information is entered, the names of related supporting documents and other required information are presented in the tax preparation checklist 440 so the user will know which documents/information they will need to provide or have at the ready when preparing their taxes.

In some embodiments, information is requested from the user only if they have indicated in a higher level question that such information is relevant. For example, the information listed below a "Dependents" checkbox in FIG. 4 only appears (in the illustrated embodiment, in cascade fashion) after the Dependents checkbox has been checked affirmatively by the user. This can also be seen with reference to FIGS. 3 and 4, where a "Got married in 2006" checkbox appears after the married filing jointly radio button has been selected. A continue button 448 is also used in some examples to indicate that a user is finished with a current section and wishes to proceed to a following section. Some embodiments also use accordions to control the display of information. FIG. 3 shows a "Personal Information" accordion and a "Personal Summary" accordion. The Personal Information accordion is shown in an expanded state, while the Personal Summary accordion is shown in a closed state. Accordions may be expanded or closed by clicking on a triangular shaped or other icon in an accordion header bar that describes the content of the accordion. The structure and use of accordions is also described in a different context in U.S. patent application Ser. No. 11/838,761 titled 'Tax-Return Preparation Systems and Methods', filed Aug. 14, 2007, which is incorporated herein by reference in its entirety.

Figure 5:
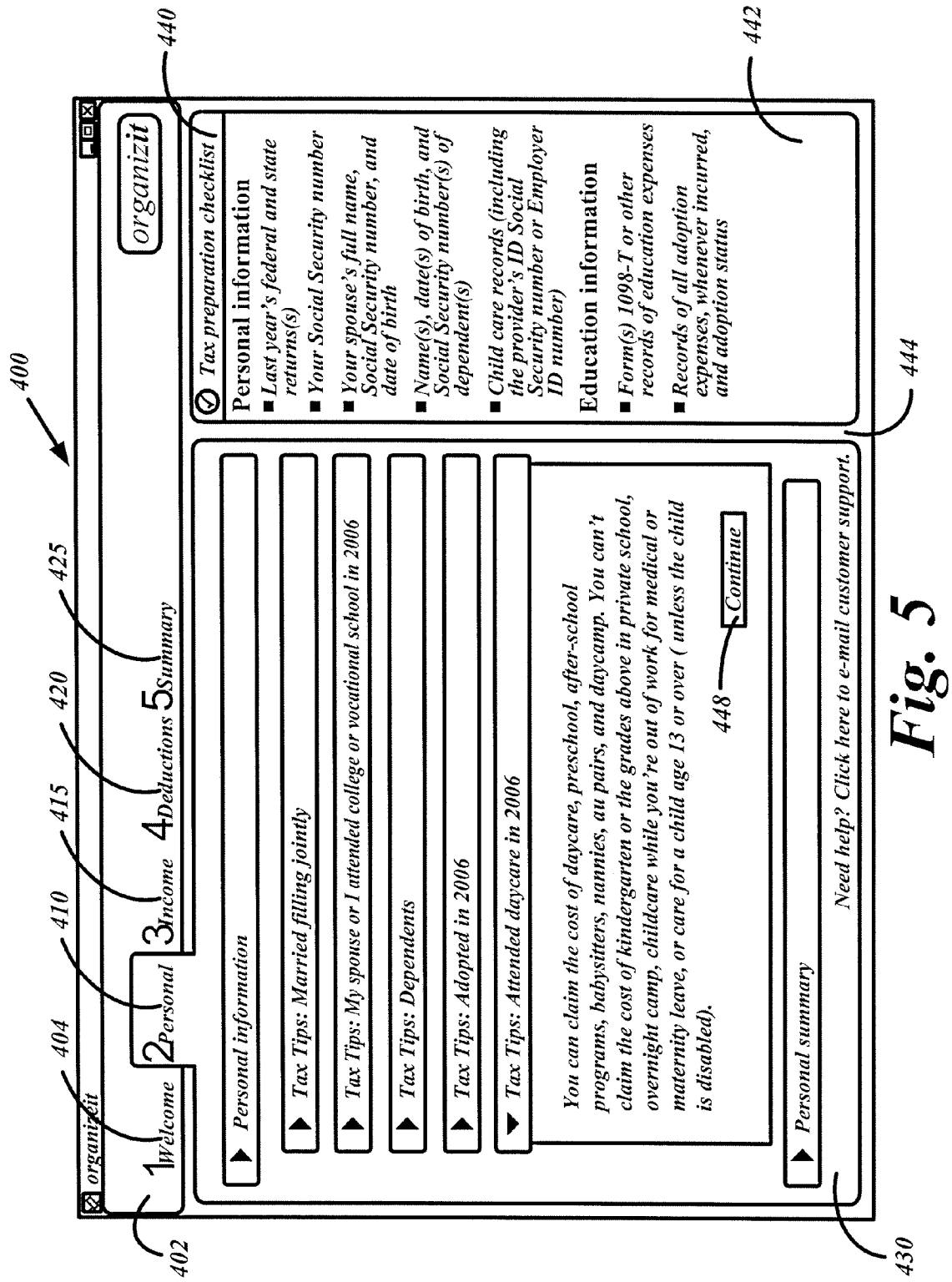

FIG. 5 shows the active personal tab 410 of the user interface 400 after personal information has been entered by the user. After the required information has been entered, advice relating to the entered information may be presented to the user. This advice is shown in a number of expandable accordions that are labeled as including tax tips. Expansion of a tax tip accordion provides advice to the user relating to particular aspects of their situation, such as the fact that they had a dependent child that attended daycare during the taxable year, for example.

Figure 6:
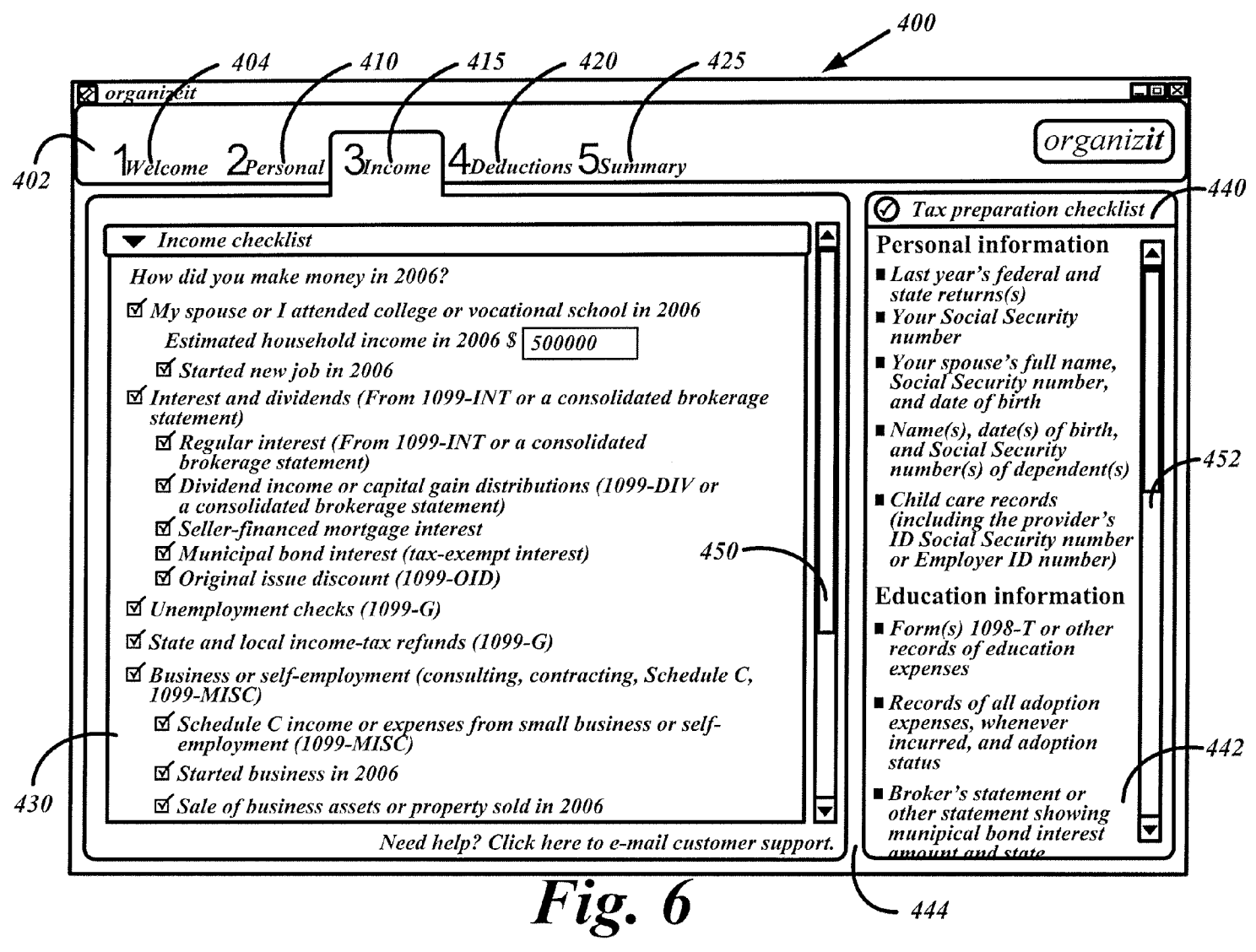

FIG. 6 shows the user interface 400 after the income tab 415 has been activated and information has been entered by the user. Information such as wage, salary, and tip (form W-2) income, interest and dividend income, and investment income is requested on the active income tab 415. As indications are made that the user had particular forms of income during the taxable year, the tax preparation checklist 440 grows to indicate the relevant supporting documents that will be needed for tax preparation. In some cases, there may be more information than can be displayed in the first window area 430 or the second window area 442. In those cases, a first scroll bar 450 for the first window area 430 and/or a second scroll bar 452 for the second window area 442 may be used to scroll through the information. Other means such as next page and previous page buttons (not shown) may also be used in some embodiments to view more information than can be displayed in any particular window.

FIG. 7 shows the user interface 400 after the deductions tab 420 has been activated and information has been entered by the user. Information such as whether the user paid home mortgage interest, donated money to charities, or had individual retirement account (IRA) contributions during the taxable year is requested on the active deductions tab 420. As indications are made that the user had particular forms of income during the taxable year, the tax preparation checklist 440 grows to indicate the relevant supporting documents that will be needed for tax preparation.

Figure 8:
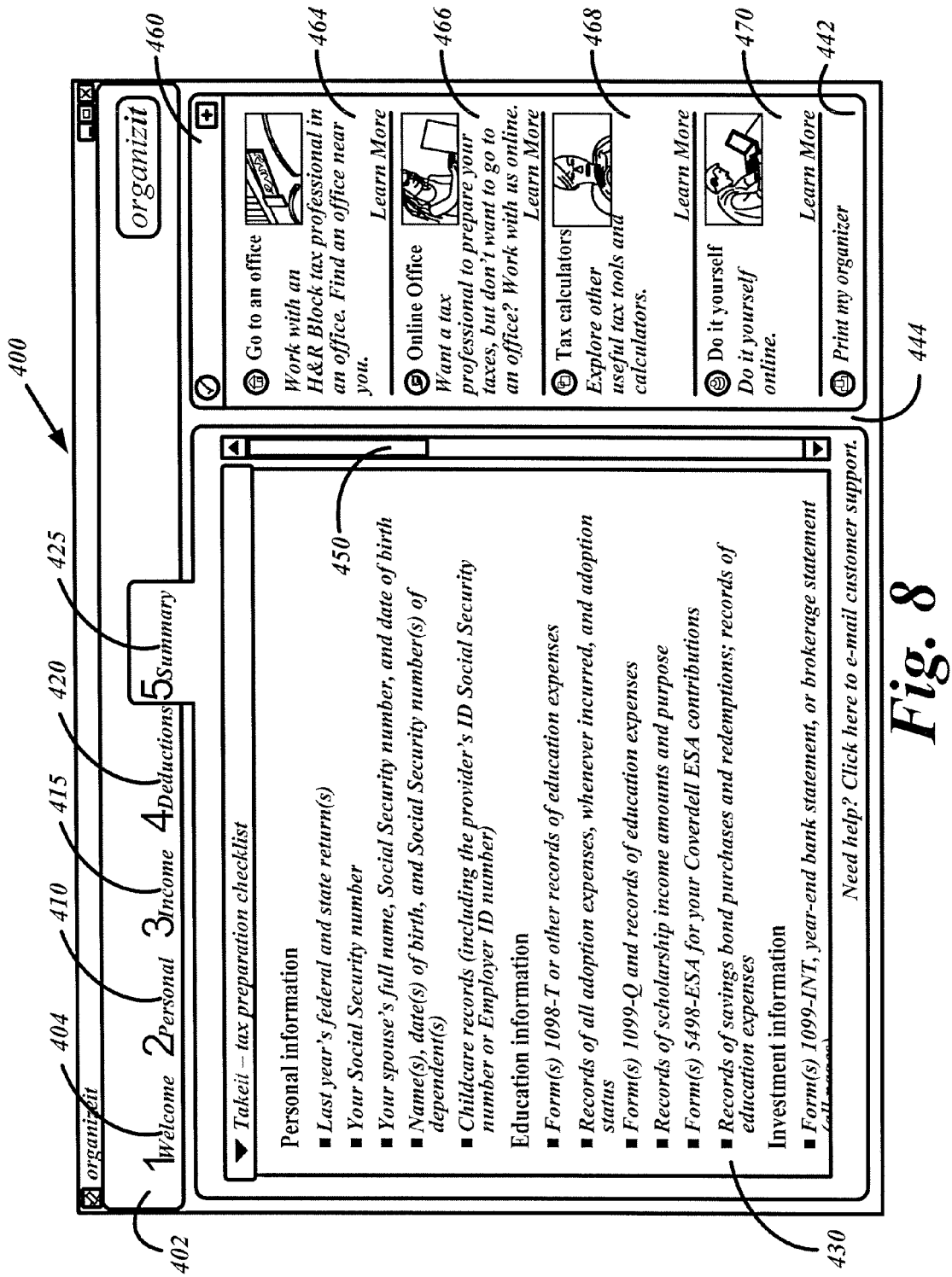

FIG. 8 shows an example of the user interface 400 after the summary tab 425 has been activated and an accordion designated as 'takeit—tax preparation checklist' has been expanded. The expanded accordion includes items that appeared in the tax preparation checklist 440, but they now appear in the first window area 430 rather than in the second window area 442. The second window area 442 now includes a title bar 460 designated as 'you got people'. The second window area 442 also includes a set of selectable utilities operable to facilitate preparation of a tax return. Such utilities include a 'print my organizer' section 462, a 'go to an office' section 464, an 'online office' section 466, a 'tax calculators' section 468, and a 'do it yourself' section 470. In an example embodiment, clicking on the 'print my organizer' section 462 brings up a print dialog box (not shown) and sends the tax preparation checklist to a designated printer. In some embodiments, relevant tax tips, such as those described with reference to FIG. 5, may also be sent to the designated printer for printing.

Still referring to FIG. 8, in one example clicking on the 'go to an office' section 464 brings up a search dialog that requests the user to enter a location near which they would like to find the nearest office offering professional return-preparation services. After the user enters location information, information for one or more of the closest offices to the entered location is presented to the user. Such information may include an address, telephone number, email address, and/or a fax number for the office locations, a map of the office locations, and/or directions to the office locations. Clicking on the 'online office' section 466 brings up additional information that can enable the user to work with a tax professional over a computer network, such as the network 220 shown in FIG. 2. In some embodiments, the user is able to transfer the answers they provided to the questions on the personal tab 410, the income tab 415, and the deductions tab 420 to the tax professional to expedite the tax preparation process. Clicking on the 'tax calculators' section 468 brings up additional tax tools and calculators for the user. Clicking on the 'do it yourself' section 470 brings up and/or links to a do it yourself tax application such as OB1. In some embodiments, the user is able to transfer the answers they provided to the do it yourself tax application. In an example embodiment, the user interface 400 also includes other accordion items (not shown) under the summary tab 425, that are viewable in the first window area 430 when the 'takeit—tax preparation checklist' accordion is closed and/or when a user scrolls down the first window area 430 by using the first scroll bar 450. Such other accordion items include a 'reviewit' accordion for providing an opportunity to review the entered answers and/or to present a closing statement to the user, an 'understandit—items to consider' accordion for presenting tailored advice to the user, and a 'that's it—what's next' accordion for presenting information to the user regarding tax preparation options.

Figure 9:
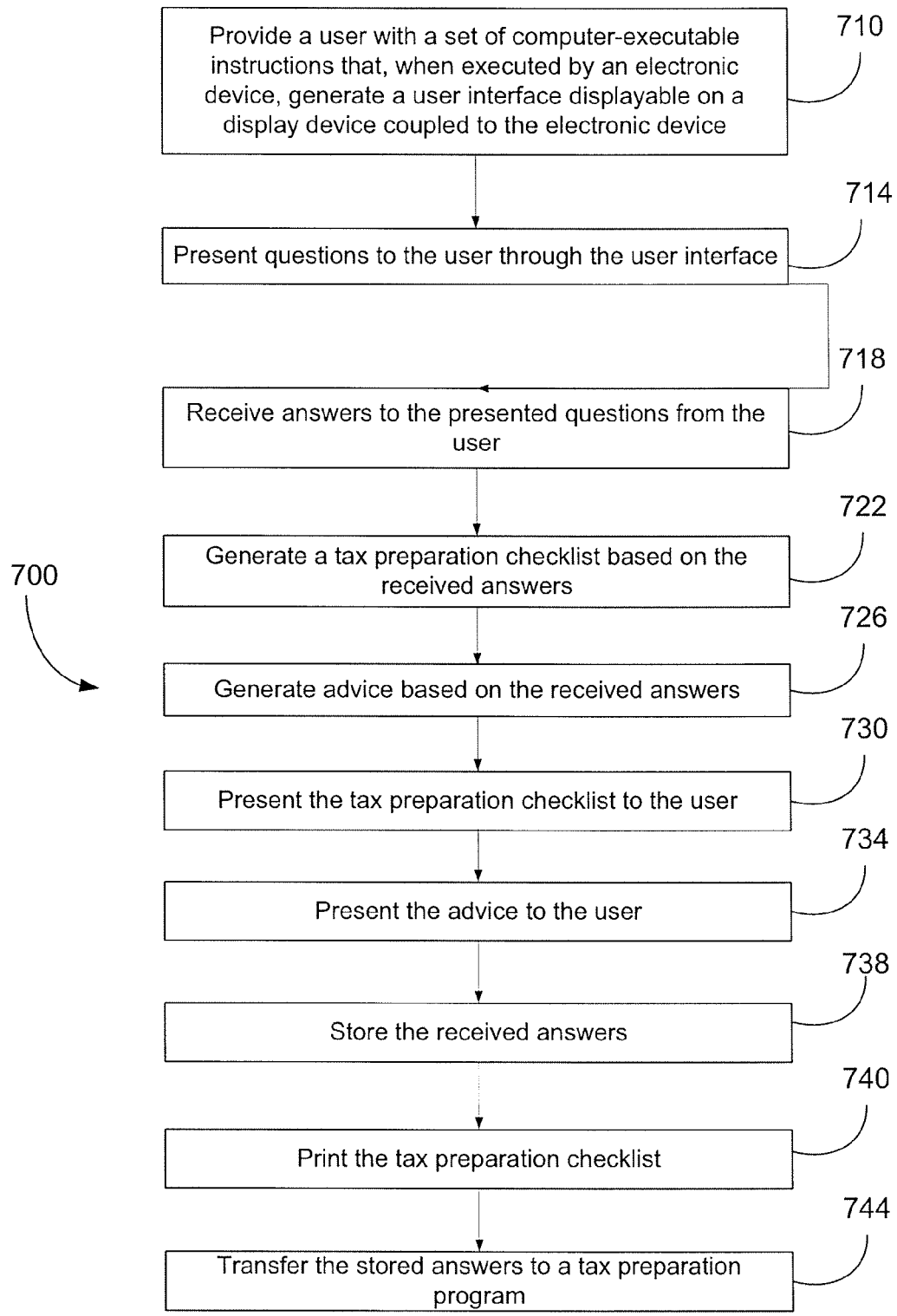
FIG. 9 shows a diagram of a process in accordance with an embodiment of the invention.

FIG. 9 illustrates a process 700 according to an embodiment of the invention. The process 700 is illustrated as a set of operations shown as discrete blocks. The process 700 may be implemented in any suitable hardware, software, firmware, or combination thereof. The order in which the operations are described is not to be necessarily construed as a limitation.

First, at a block 710, a user is provided with a set of computer-executable instructions that, when executed by an electronic device, generate a user interface displayable on a display device coupled to the electronic device. Then, at a block 714, questions are presented to the user through the user interface. Next, at a block 718, answers are received from the user to the presented questions. Then, at a block 722, a tax preparation checklist is generated based on the received answers. Next, at a block 726, advice is generated based on the received answers. Then, at a block 730, the tax preparation checklist is presented to the user. Next, at a block 734, the advice is presented to the user. Then, at a block 738, the received answers are stored, such as on the non-removable storage device 110 shown in FIG. 1 or database 240 of FIG. 2. Next, at a block 740, the tax preparation checklist is printed. Then, at a block 744, the stored answers are transferred to a tax preparation program.

Although the steps listed in the method 700 are presented in a particular order in FIG. 9, it should be understood that many of the steps may occur in differing orders or simultaneously without departing from the invention. For example, the tax preparation checklist and the advice may be presented in differing orders or simultaneously to the user. In addition, in an example embodiment, the tax preparation checklist is presented incrementally to the user as the user answers the presented questions. In some embodiments, the steps may be performed on the user's computer, while in other embodiments, some or all of the steps are conducted over a computer network, such as the network 220 shown in FIG. 2, for example. In other embodiments, storing the received answers may occur after each answer is entered or not at all, and/or stored answers may not be transferred to a tax preparation program and/or items may not be printed.

While a preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method comprising:
   providing to a user a set of computer-executable instructions that, when executed by a user's electronic device, generate a user interface displayable on a display device coupled to the user's electronic device;
   presenting to the user, in a first region of the user interface, a plurality of solicitations for a set of personal information describing characteristics of the user;
   receiving via the user interface the personal information set;
   based on the personal information set, generating to a second region of the user interface a checklist of tax return preparation information to be compiled by the user;
   displaying the plurality of solicitations and the checklist simultaneously and respectively in the first and second regions of the user interface; and
   incrementally generating the checklist in the second region as the user responds to each of the plurality of solicitations.

2. The method of claim 1, wherein at least one of presenting solicitations and generating the checklist are performed by a desktop application executing on the user's electronic device.

3. The method of claim 1, wherein at least one of presenting solicitations, generating the checklist, and receiving the information set is performed by a second electronic device remote from the user's electronic device.

4. The method of claim 1, wherein presenting solicitations includes presenting questions regarding tax filing status, income, and deductions.

5. The method of claim 1, further comprising storing the received personal information set for use in a tax-return preparation program.

6. The method of claim 5, further comprising transferring the stored answers to the tax-return preparation program.

7. The method of claim 1, wherein the personal information set excludes information personally identifying the user.

8. A computer-readable medium having computer-executable instructions that, when executed by a user's electronic device, enable the user's electronic device to perform steps comprising:
   generating a user interface displayable on a display device coupled to the user's electronic device;
   presenting to the user, in a first region of the user interface, a plurality of solicitations for a set of personal information describing characteristics of the user;
   receiving via the user interface the personal information set;
   based on the personal information set, generating to a second region of the user interface a checklist of tax return preparation information to be compiled by the user;
   displaying the plurality of solicitations and the checklist simultaneously and respectively in the first and second regions of the user interface; and
   incrementally generating the checklist in the second region as the user responds to each of the plurality of solicitations.

9. The medium of claim 8, wherein the instructions further enable the user's electronic device to perform the step of generating to the user interface a user-selectable set of advisory information explaining the plurality of solicitations.

10. The medium of claim 8, wherein presenting solicitations includes presenting questions regarding marital status, income, and deductions.

11. The system of claim 8, wherein the instructions further enable the user's electronic device to perform the step of storing the received personal information set for use in a tax-return preparation program.

12. The system of claim 11, wherein the instructions further enable the user's electronic device to perform the step of transferring the stored personal information set to the tax-return preparation program.

13. A system comprising:
   (a) a memory device; and
   (b) a first electronic device coupled to the memory device and configured to:
   (1) generate a user interface displayable on a display device coupled to a user's electronic device;
   (2) present to the user, in a first region of the user interface, a plurality of solicitations for a set of personal information describing characteristics of the user;
   (3) receive via the user interface the personal information set;
   (4) based on the personal information set, generate to a second region of the user interface a checklist of tax return preparation information to be compiled by the user;
   (5) display the plurality of solicitations and the checklist simultaneously and respectively in the first and second regions of the user interface; and
   (6) incrementally generate the checklist in the second region as the user responds to each of the plurality of solicitations.

14. The system of claim 13, wherein the first electronic device is further configured to generate to the user interface a user-selectable set of advisory information explaining the plurality of solicitations.

15. The system of claim 13, wherein presenting solicitations includes presenting questions regarding marital status, income, and deductions.

16. The system of claim 13, wherein the first electronic device is further configured to store to the memory device the received personal information set for use in a tax-return preparation program.

17. The system of claim 16, wherein the first electronic device is further configured to transfer the stored personal information set to the tax-return preparation program.

* * * * *